US010712921B2

(12) United States Patent
König et al.

(10) Patent No.: US 10,712,921 B2
(45) Date of Patent: Jul. 14, 2020

(54) AUTHORING A COLLECTION OF IMAGES FOR AN IMAGE GALLERY

(71) Applicant: Apple Inc., Cupertino, CA (US)

(72) Inventors: George R. König, Campbell, CA (US); Pepijn Zoon, San Francisco, CA (US); Andre Abelmann, San Jose, CA (US); Suchita C. Doshi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/134,885

(22) Filed: Sep. 18, 2018

(65) Prior Publication Data

US 2019/0310767 A1  Oct. 10, 2019

Related U.S. Application Data

(60) Provisional application No. 62/655,107, filed on Apr. 9, 2018.

(51) Int. Cl.
*G06F 17/00* (2019.01)
*G06F 3/0484* (2013.01)
*G06F 3/0486* (2013.01)
*G06F 3/0488* (2013.01)
*G06F 3/0485* (2013.01)

(52) U.S. Cl.
CPC ........ *G06F 3/04845* (2013.01); *G06F 3/0485* (2013.01); *G06F 3/0486* (2013.01); *G06F 3/04883* (2013.01)

(58) Field of Classification Search
CPC ............ G06F 3/04845; G06F 3/04883; G06F 3/0486; G06F 3/0485
See application file for complete search history.

(56) References Cited

U.S. PATENT DOCUMENTS

| | | | | |
|---|---|---|---|---|
| 8,812,945 B2 * | 8/2014 | Sidon | ................ | G06F 16/9038 715/202 |
| 10,423,320 B2 * | 9/2019 | Williams | ............ | G06F 3/04883 |
| 2002/0135621 A1 * | 9/2002 | Angiulo | ................ | G06F 16/958 715/838 |
| 2008/0235585 A1 * | 9/2008 | Hart | ........................ | G06F 16/44 715/717 |
| 2009/0254515 A1 * | 10/2009 | Terheggen | .............. | G06F 16/41 |
| 2012/0054670 A1 * | 3/2012 | Rainisto | ................ | G06F 3/0485 715/784 |
| 2012/0110515 A1 * | 5/2012 | Abramoff | ............. | G06F 16/904 715/854 |
| 2013/0239049 A1 * | 9/2013 | Perrodin | ............... | G06F 3/0481 715/800 |

(Continued)

*Primary Examiner* — Laurie A Ries
(74) *Attorney, Agent, or Firm* — Invoke

(57) ABSTRACT

Techniques and systems for a graphical user interface based multimedia authoring tools to create gallery components are disclosed. A multimedia authoring tool as described herein can provide functionality for creating, editing, and displaying interactive image galleries. The multimedia authoring tool, for example, can enable authors to drag and drop image files into a multimedia editing area of the tool's graphical user interface to create an image gallery that includes the corresponding images without having to create a gallery beforehand. The image gallery can provide a control for navigating the gallery's images which can be arranged in a strip such as a vertical or horizontal strip.

24 Claims, 10 Drawing Sheets

(56) References Cited

U.S. PATENT DOCUMENTS

| | | | | |
|---|---|---|---|---|
| 2014/0047413 | A1* | 2/2014 | Sheive | H04L 65/403 |
| | | | | 717/110 |
| 2014/0075354 | A1* | 3/2014 | Ko | G06F 3/04883 |
| | | | | 715/769 |
| 2014/0115446 | A1* | 4/2014 | Hall | G06F 17/212 |
| | | | | 715/243 |
| 2015/0074504 | A1* | 3/2015 | Steinfl | G06F 3/0482 |
| | | | | 715/202 |
| 2015/0085317 | A1* | 3/2015 | Kim | G06F 3/0488 |
| | | | | 358/1.15 |
| 2015/0178391 | A1* | 6/2015 | Villaron | G06F 3/04842 |
| | | | | 707/722 |
| 2015/0234568 | A1* | 8/2015 | Jackson | G06F 3/04815 |
| | | | | 715/822 |
| 2015/0253962 | A1* | 9/2015 | Cho | G06F 3/04842 |
| | | | | 715/765 |
| 2015/0277686 | A1* | 10/2015 | LaFrge | H04L 67/10 |
| | | | | 715/723 |
| 2016/0034437 | A1* | 2/2016 | Yong | G06F 40/166 |
| | | | | 715/202 |
| 2016/0092416 | A1* | 3/2016 | Kohlmeier | G06F 3/0482 |
| | | | | 715/202 |
| 2016/0371815 | A1* | 12/2016 | Patankar | G06T 3/4007 |
| 2017/0034451 | A1* | 2/2017 | Lee | H04N 5/23216 |
| 2018/0247624 | A1* | 8/2018 | Elkins | G10H 1/18 |
| 2019/0012051 | A1* | 1/2019 | Jeon | G06F 3/0482 |

* cited by examiner

AUTHORING A COLLECTION OF IMAGES FOR AN IMAGE GALLERY

CROSS REFERENCE TO RELATED APPLICATION

This disclosure claims the benefit of the priority of U.S. Provisional Patent Application No. 62/655,107, filed on Apr. 9, 2018. The above-identified application is incorporated herein by reference in its entirety.

TECHNICAL FIELD

This disclosure relates generally to graphical user interface (GUI) based authoring tools.

BACKGROUND

Authors can use editing platforms to create documents for wide dissemination of information. An editing platform's graphical user interface provides tools for inputting and arranging content such as text and images. The editing platform can render content in real time as to provide a sense of the actual layout of a final or published version of the document. The editing platform can store the document in a proprietary file format or an open source file format. In some implementations, the editing platform can output a document in accordance with Extensible Markup Language (XML), JavaScript Object Notation (JSON), or Hypertext Markup Language (HTML).

SUMMARY

Techniques, tools, and systems for authoring a collection of images for an image gallery are disclosed. A multimedia authoring tool as described herein can provide functionality for creating, editing, and displaying interactive image galleries. The multimedia authoring tool, for example, can enable authors to drag and drop image files into a multimedia editing area of the tool's GUI to automatically create an image gallery that includes the corresponding images without having to create a gallery beforehand. The image gallery can provide a control for navigating the gallery's images which can be arranged in a strip such as a vertical or horizontal strip. When dragging one or more image files from a file finder into a document, the multimedia authoring tool can cause a cursor to change to an add (+) icon to show when the author is able to add the one or more image files.

If a single image file is dropped on an editing area, then the authoring tool can create an image component within the document that includes the corresponding image. If multiple image files are dropped on the editing area, then the authoring tool can create a gallery component within the document that includes the corresponding images. If one or more image files are dropped on a pre-existing image component currently being displayed within the editing area, then the authoring tool can convert the image component into a gallery component and include the additional one or more images in the gallery component.

Particular implementations disclosed herein provide one or more of the following advantages. The described technology can provide a means for rapidly creating, editing, and displaying interactive image galleries in documents. The described technology can interpret an input including multiple images offered from the operation system's file system to create a gallery component without the need for the user to create an empty gallery component beforehand, which saves the user time and simplifies document editing. The described technology can accept an input of dropping multiple images onto the authoring tool or interpreting an input of selecting multiple images. The described technology can readily convert a single image component into a gallery component based on a user input that adds one or more additional images. The described technology can readily convert a gallery component into a single image component into based on a user input that removes one or more images from the gallery component. The authoring tool can provide contextual insertion indicators to indicate allowable dropping areas. The authoring tool can easily change the order of images inside a gallery with drag and drop user inputs. The authoring tool can provide an interface to easily relocate the entire gallery in a document. The authoring tool can provide smart keyboard interactions for editing and navigating. The authoring tool can scroll based on a dragging position. The authoring tool can provide intuitive focusing on an image when using keyboard navigation.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
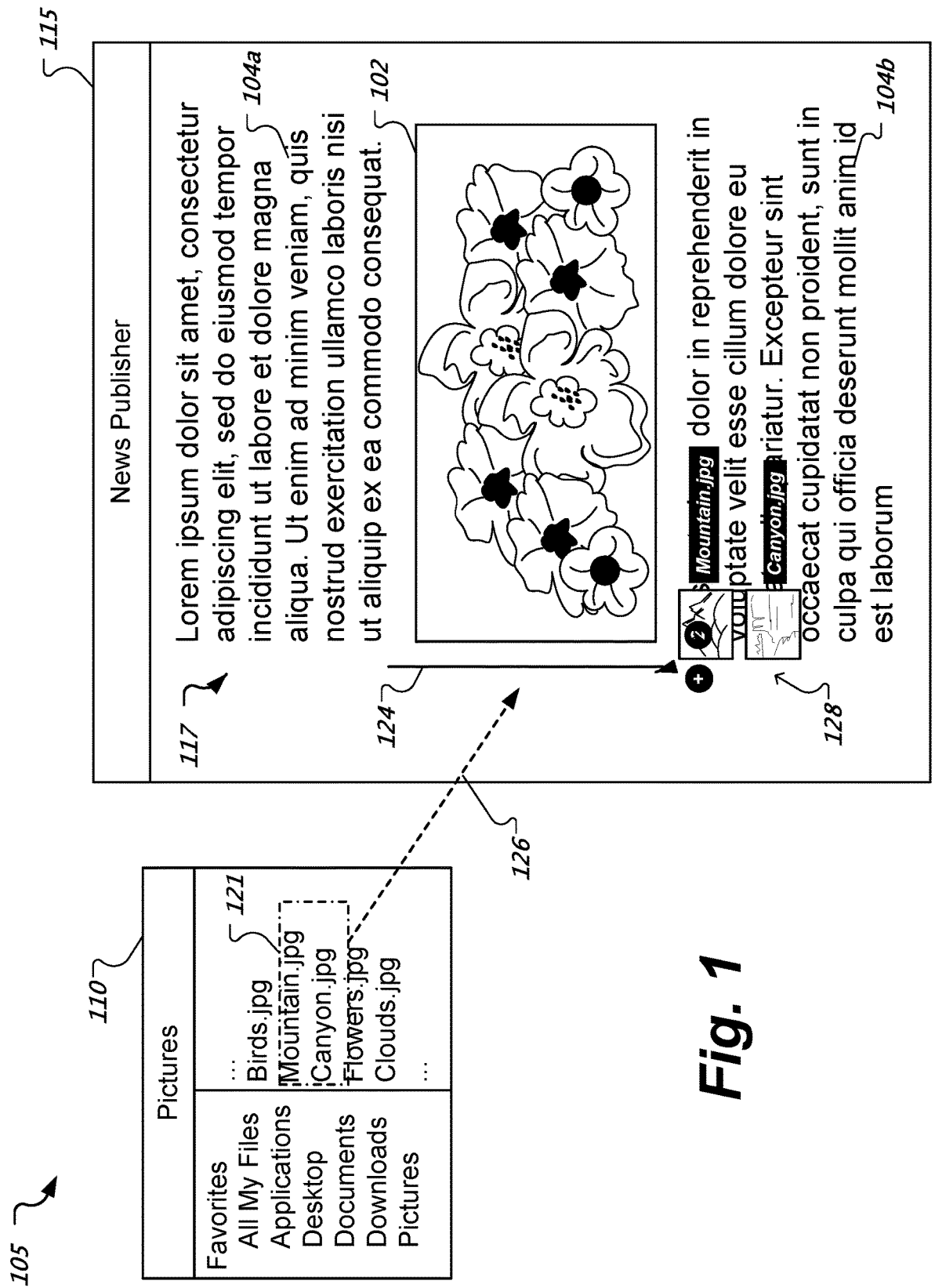
FIG. 1 illustrates a layout of an example of a screen image of a graphical user interface displaying a file finder and a multimedia authoring tool and illustrates user inputs that transform an image component into a gallery component.

FIG. 1 illustrates a layout of an example screen image 105 of a graphical user interface displaying a file finder 110 and a multimedia authoring tool 115 and illustrates user inputs that transform an image component 102 into a gallery component. The multimedia authoring tool 115 displays a multimedia editing area 117 for creating and editing content within a document. The document includes components such as the image component 102 and text components 104a-b.

The file finder 110 is configured to display a navigable directory structure that allows a user to select one or more files. In this example, the user makes a file selection 121 of two files containing respective images. Selection of more or less files is possible. The user can make the file selection 121 via a user input such as mouse input, touch-based input, or keyboard input.

Via a navigation input 126, such as a drag input via a mouse movement or touch gesture, the user drags the file selection 121 to the authoring tool 115. In some implementations, the navigation input 126 is a stream of coordinates that correspond to path taken by an input device such as a mouse or touch-based input device. In some implementations, the navigation input has an associated location positionable within the multimedia editing area 117 and is associated with the selected files. Once the navigation input 126 indicates that the user's pointer location is hovering over the multimedia editing area 117 within the authoring tool 115, the authoring tool 115 can render a file grouping overlay 128, an add (+) icon, and an image quantity icon. The file grouping overlay 128 can include renderings of each image in the file selection 121, respective file names, or both. The authoring tool 115 further displays a vertical insertion line indicator 124 adjacent to the image component 102 to indicate the potential creation of a gallery component that includes the images of the file grouping overlay 128 and the existing image component 102. In some implementations, a user input such as a release of the drag user input will cause the authoring tool 115 to convert the image component 102 to a gallery component that includes the image of the image component 102 and the images of the file grouping overlay 128. In some implementations, converting the image component 102 can include replacing the image component 102 with a gallery component. In some implementations, converting the image component 102 can include changing an object type of the image component 102 to a gallery component type and adding the additional images.

Figure 2:
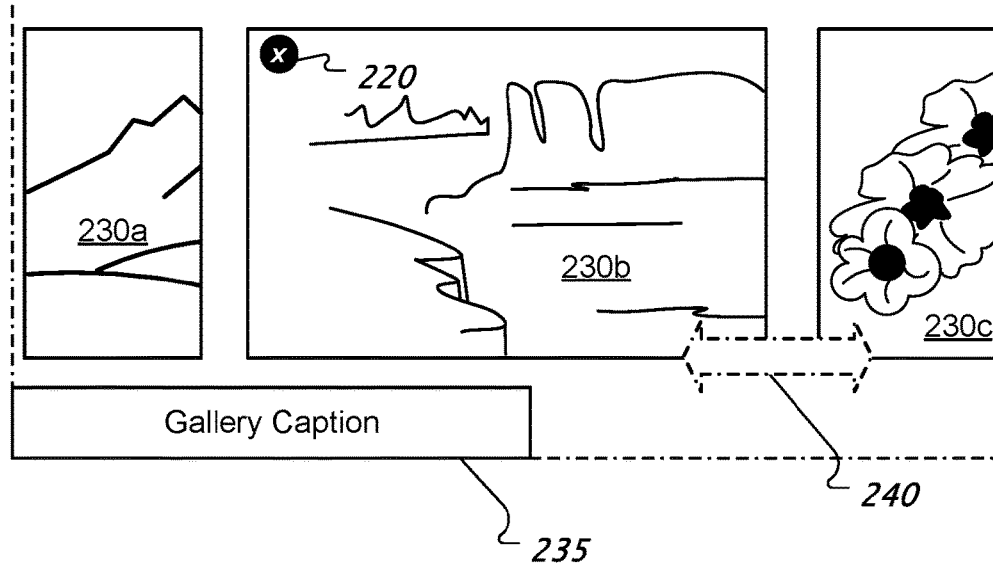
FIG. 2 illustrates a layout of an example of a screen image of a graphical user interface displaying an authoring tool after a creation of a gallery component caused by the user inputs of FIG. 1.

FIG. 2 illustrates a layout of an example screen image of a graphical user interface displaying an authoring tool 115 after a creation of a gallery component 215 caused by the navigation input 126 of FIG. 1. In this example, the gallery component 215 is created within the document in response to the navigation input 126 of FIG. 1 and the associated file selection 121. The gallery component 215 contains gallery items that correspond to respective images 230a, 230b, and 230c. The images 230a-c correspond to the image in the original image component 102 and the files within the file selection 121 of FIG. 1.

The authoring tool 115 can render the gallery component 215 by displaying the gallery's images 230a-c as a horizontal strip. In some implementations, the height of the widest one of the images 230a-c is used to determine a height of the displayed area of the gallery component 215. A displayed portion of the images 230a-c can include one or more partially displayed images, e.g., image 230a and image 230c, and a fully displayed image 230b. Given that some of the images are occluded, the authoring tool 115 can provide a gallery control to navigate images 230a-c within the gallery component 215. A user can make a swipe gesture 240 over the gallery area to navigate the images 230a-c. For example, a swipe left can cause the a displayed portion of the images 230a-c to move left thereby changing which images are fully displayed and which images are partially displayed.

The authoring tool 115 can render a text box that includes a gallery caption 235 in an area near the images 230a-c of the gallery component 215. When in editing mode, the gallery component 215 can render a delete button 220 in a selected image 230b. A user input, such as a click input or a touch input, on the delete button 220 can remove the selected image 230b from the gallery component 215. In some implementations, a user can delete the selected image by keyboard input backspace or delete. In some implementations, the gallery component 215 includes multiple images by having an array of links to multiple images. In some implementations, a link includes a Uniform Resource Locator (URL). In some implementations, a link includes a file path and filename. The authoring tool 115 can be configured to obtain images 230a-c of the gallery component 215 by retrieving images specified by the embedded links. In some implementations, the images 230a-c can be a selected frame of a video.

Figure 3:
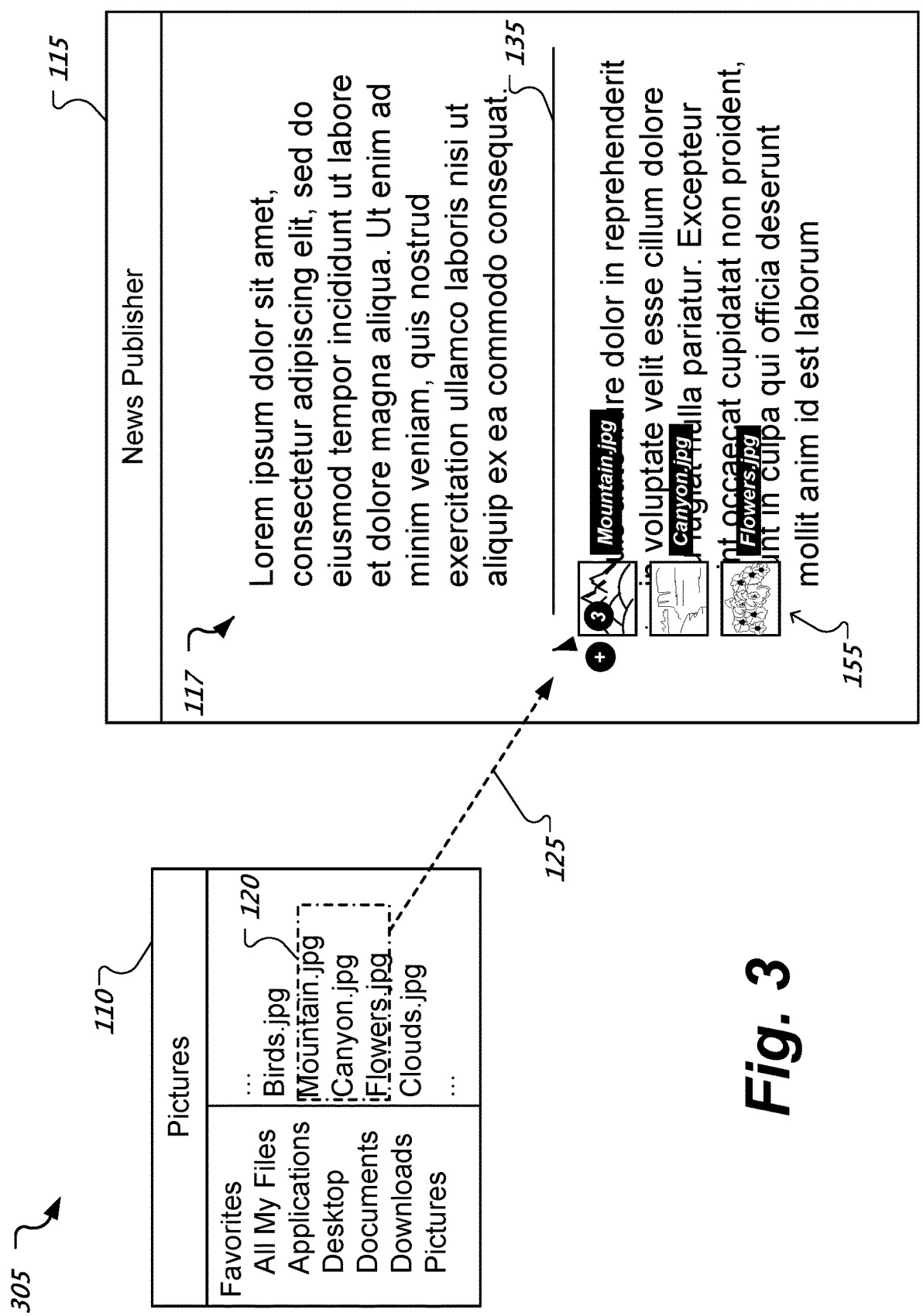
FIG. 3 illustrates a layout of another example of a screen image of a graphical user interface displaying the file finder and the authoring tool.

FIG. 3 illustrates a layout of another example of a screen image 305 of a graphical user interface displaying the file finder 110 and the authoring tool 115. The authoring tool 115 displays an editing area 117 for creating and editing contents within a document. The file finder 110 is configured to display a navigable directory structure that allows a user to select one or more files. In this example, the user makes a file selection 120 of three files containing respective images. Selection of more or less files is possible. The user can make the file selection 120 via a user input such as mouse input, touch-based input, or keyboard input.

Via a navigation input 125, such as a drag input via a mouse movement or touch gesture, the user drags the file selection 120 to the authoring tool 115. Once the navigation input 125 indicates that the user's input device such as a mouse of touch input is hovering over an editing area 117 within the authoring tool 115, the authoring tool 115 can render gallery creation indicator that indicates an insertion point. In this example, the authoring tool renders an insertion indicator such as a horizontal insertion line indicator 135, an add (+) icon, image quantity icon, and a file grouping overlay 155. Other types of gallery creation indicators are possible and can vary based on operating system, browser, etc. The file grouping overlay 155 can include renderings of each image in the file selection 120, respective file names, or both. A drop user input such as a release of the navigation input 125 will cause the authoring tool 115 to create at the drop site a gallery component that includes the images associated with the files of the file selection 120. An example of the created gallery component is illustrated in FIG. 2.

Figure 4:
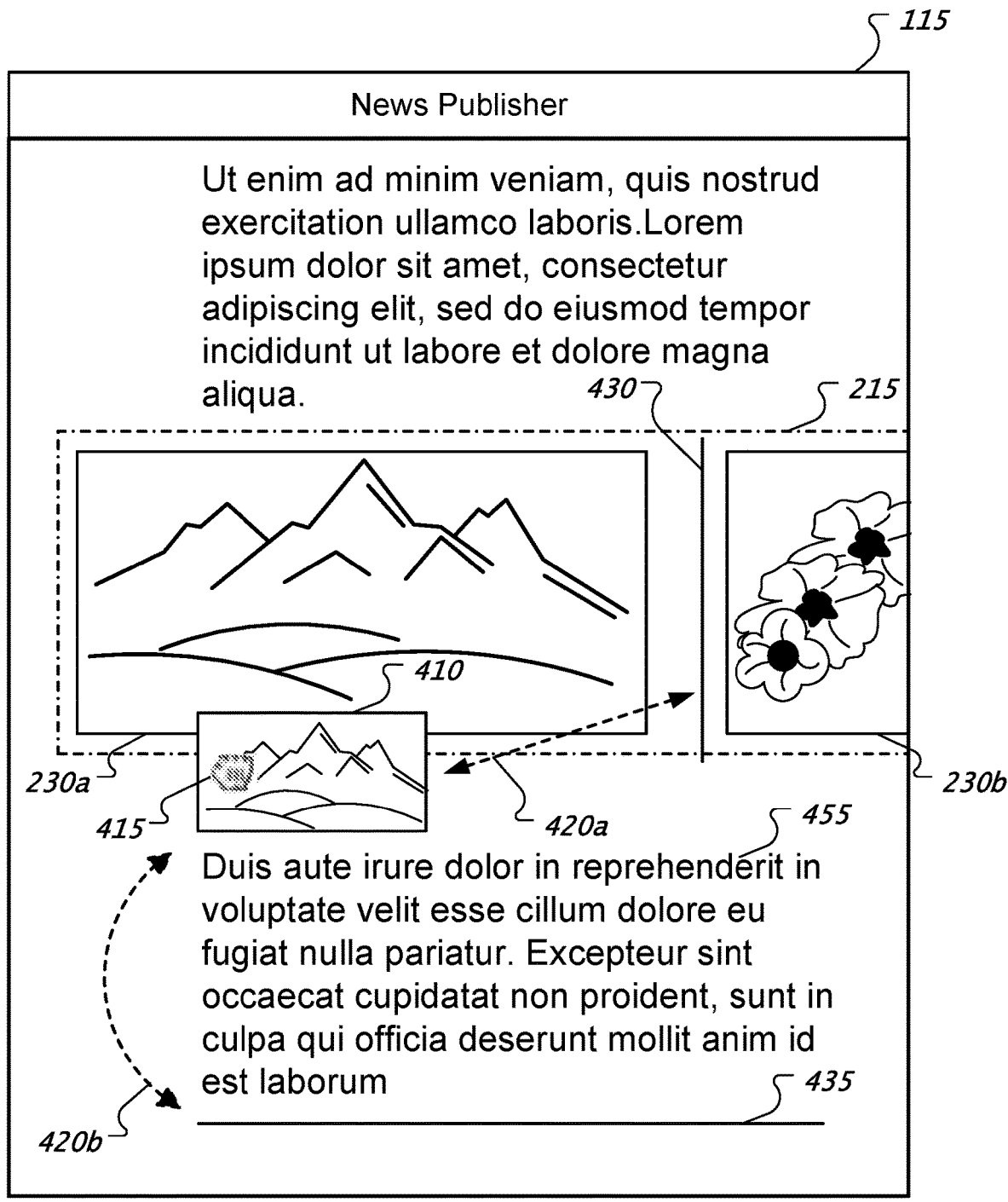
FIG. 4 illustrates a layout of an example screen image of a graphical user interface displaying an authoring tool and illustrates different types of user inputs to move an image of a gallery component.

FIG. 4 illustrates a layout of an example screen image of a graphical user interface displaying an authoring tool 115 and illustrates different types of user inputs 420a-b to move an image 230a of a gallery component 215. User inputs such as a selection input corresponding to image 230a can cause a placeholder image 410 to be displayed with an overlaying hand grabber icon 415. The placeholder image 410 can be a smaller version of the image 230a, which can be referred to as a thumbnail image. Subsequent user inputs 420a-b, such as a drag input, can move the hand grabber icon 415 to various points within the document.

The first illustrated user input 420a moves the hand grabber icon 415 to a position between two images 230a-b within the gallery component 215. When the hand grabber icon 415 is between images 230a-b, a vertical insertion line indicator 430 can be displayed. If the user continues moving a pointer location passed image 230b and then causes a release user input, the authoring tool 115 can change an ordering of the images 230a-c within the gallery component 215.

The second illustrated user input 420b moves the hand grabber icon 415 to a position outside of the gallery component 215 and below a text component 455 within the document. In this example, the text component 455 includes a text paragraph. The second user input 420b results in a horizontal insertion line indicator 435 being displayed below the text component 455. If the user causes a release user input at the location corresponding to the horizontal insertion line indicator 435, the authoring tool 115 extracts the image 230a from the gallery component 215 and uses the image 230a to create a standalone image component. Extracting the image 230a can include removing a link pointer to the image 230a from the gallery component 215 and including link pointer in the image component. If another gallery component exists, the second user input 420b can move the image 230a into another gallery component.

The authoring tool can enable users to move entire image or gallery components within a document. In some implementations, when grabbing an image or gallery component via a user input, the authoring tool can change a cursor to a grabbing hand. In some implementations, an image or gallery component can be picked-up via a user input, and the authoring tool can replace the component with a placeholder image while the component is in the picked-up state. The tool can display an insertion indicator when the user is able to "drop" the image or gallery component.

Figure 5:
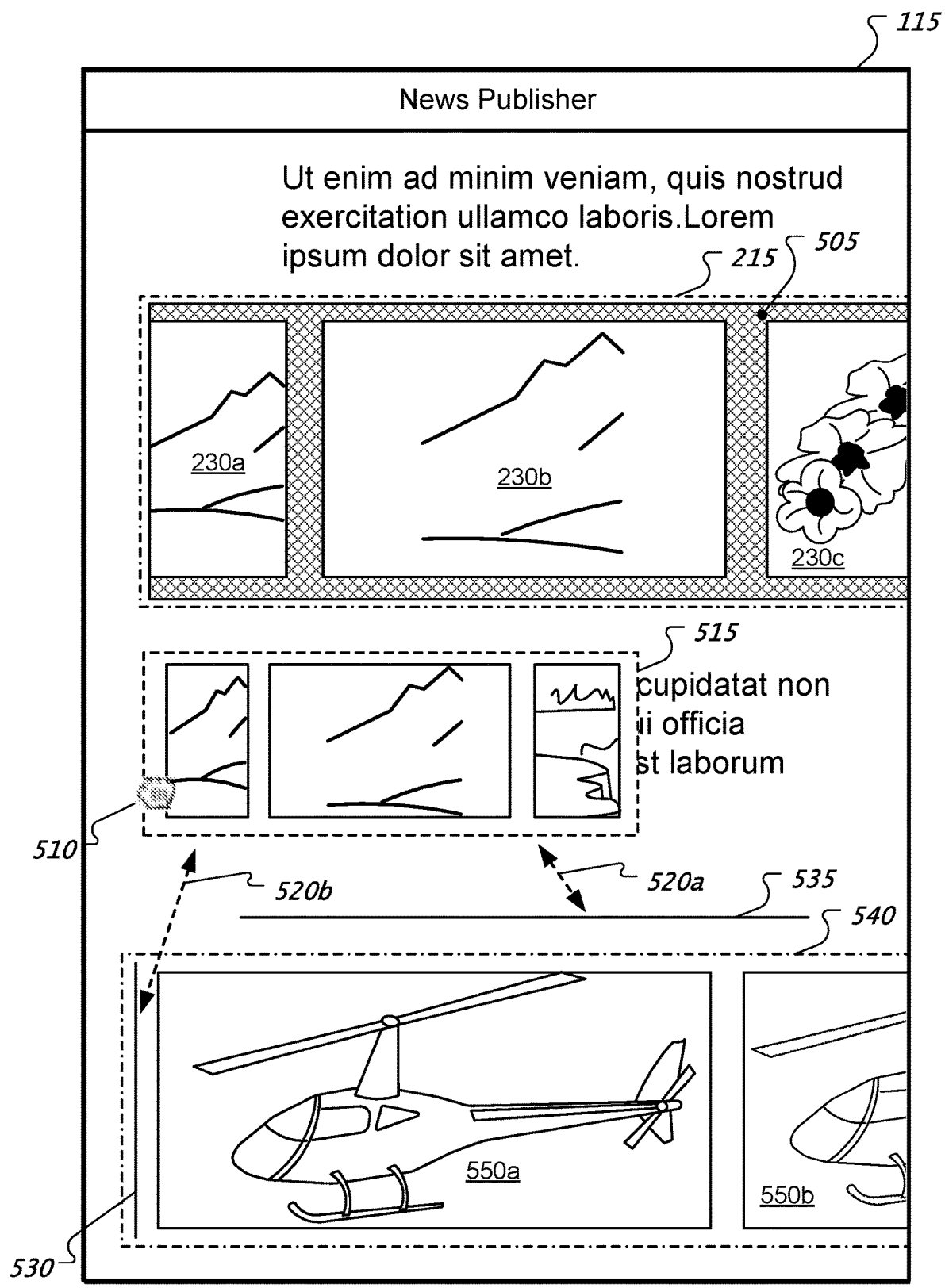
FIG. 5 illustrates a layout of an example screen image of a graphical user interface displaying an authoring tool and illustrates different types of user inputs to move the gallery component.

FIG. 5 illustrates a layout of an example screen image of a graphical user interface displaying an authoring tool 115 and illustrates different types of user inputs 520a, 520b to move the gallery component 215. Once selected, the gallery component 215 can be moved to different locations via different user inputs 520a-b. In some implementations, receiving a user input that selects the gallery component 215 can cause the authoring tool 115 to render a gallery highlight 505 on or about the gallery component 215. Selecting and dragging the gallery component 215 causes a placeholder image 515 to be displayed with an overlaying hand grabber icon 510. In this example, the placeholder image 515 includes the one or more displayed portions of the images 230a-c associated with the gallery component 215.

User inputs 520 a-b can move the hand grabber icon 510 to various points within the document. For example, a first user input 520 a moves the hand grabber icon 510 to a position outside of the gallery component 215 and outside of any other gallery or image components associated with the document. When the hand grabber icon 510 is outside as such, the authoring tool 115 can display a horizontal insertion line indicator 535 corresponding to a current pointer location. Upon a subsequent release user input, the authoring tool 115 can modify the document to reflect a change in the positioning of the gallery component 215 with respect to other components within the document.

A second user input 520b moves the hand grabber icon 510 to a position outside of the gallery component 215 but over a destination gallery component 540 including images 550a, 550b. In response to the second user input 520, the authoring tool 115 can display a vertical insertion line indicator 530 within the destination gallery component 540. Upon a subsequent release user input, the authoring tool 115 can modify the destination gallery component 540 to include images from the source gallery component 215, and remove the source gallery component 215 from the document.

The authoring tool can provide controls for keyboard interactions within a document. In response to a key down input from a text component to a gallery component, the tool can change the focus from the text component to the gallery component. A subsequent key down input can move the focus from the gallery component to a gallery item, e.g., image, within the gallery component. The left and right arrows can be used to navigate between images inside the gallery component. A subsequent key down input can move the focus from the gallery item to a caption of the gallery component. A subsequent key down input can move the focus from the gallery caption to a text component below the gallery component. Key up inputs can move the focus in the reverse direction.

In another example, in response to a key down input from a text component to an image component, the tool can change the focus from the text component to the image component. A subsequent key down input can move the focus from the image component to a caption of the image component. In response to a key up input from a text component to an image component, the tool can change the focus from the text component to the image component. In response to a key down input from a text component to a gallery component, the tool can change the focus from the text component to the gallery component. A subsequent key down input can move the focus from the gallery component to a caption of the gallery component.

In response to a key up input from a text component to a gallery component, the tool can move the focus from the text component to an image of the gallery component. The tool can determine a specific image of the gallery component to focus based on which ones of the gallery images are currently being displayed. For example, if gallery image A is 75% visible, whereas gallery image B is 25% visible, the tool can select gallery image A due to its larger percentage of being displayed. A subsequent key up input can move the selection and focus to the next image of the gallery component, e.g., from image A to image B. Once selected, additional key inputs can change the position of the image relative to other images within the gallery component. In some implementations, the selected image is displayed in a center region of the gallery component. If a gallery becomes selected, a key input can change the position of the gallery relative to other components in the document.

The authoring tool can provide controls for scroll interactions within a document. For example, when the content of the gallery is wider than the gallery, the tool can provide a horizontal scroll interface to move the content of the gallery to left or right. When dragging files from the file finder and having a location pointer, such as a mouse pointer or a touch pointer, positioned on the left side of the gallery, the tool can move the content of the gallery to the right. When dragging files from the file finder and having the pointer, positioned on the right side of the gallery, the tool can move the content of the gallery to the left. When reordering an image and having the pointer positioned on the left side of the gallery, the tool can move the content of the gallery to the right. When reordering an image and having the pointer positioned on the right side of the gallery, the tool can move the content of the gallery to the left.

In some implementations, when an image of an image component is selected, the authoring tool shows a thick selection rectangle about the selected image and an (X) icon in the top left corner of the selected image. Receiving a user input on this icon, such as a click input or a touch input, can cause the tool to remove the image component from the document.

In some implementations, when an image of a gallery component is selected, the authoring tool shows a thick selection rectangle about the selected image and shows an (X) icon in the top left corner of the selected image. Receiving a user input on this icon, such as a click input or a touch input, can cause the tool to remove the image from the gallery component. In some implementations, a user input such as a keyboard input backspace or delete can delete a selected image or gallery.

In some implementations, when an entire gallery component is selected, the authoring tool shows a thick selection rectangle about the selected gallery and shows an (X) icon in the top left corner of the selected gallery. Receiving a user input on this icon, such as a click input or a touch input, can cause the tool to remove the entire gallery component and all of its associated images from the document.

Figure 6:
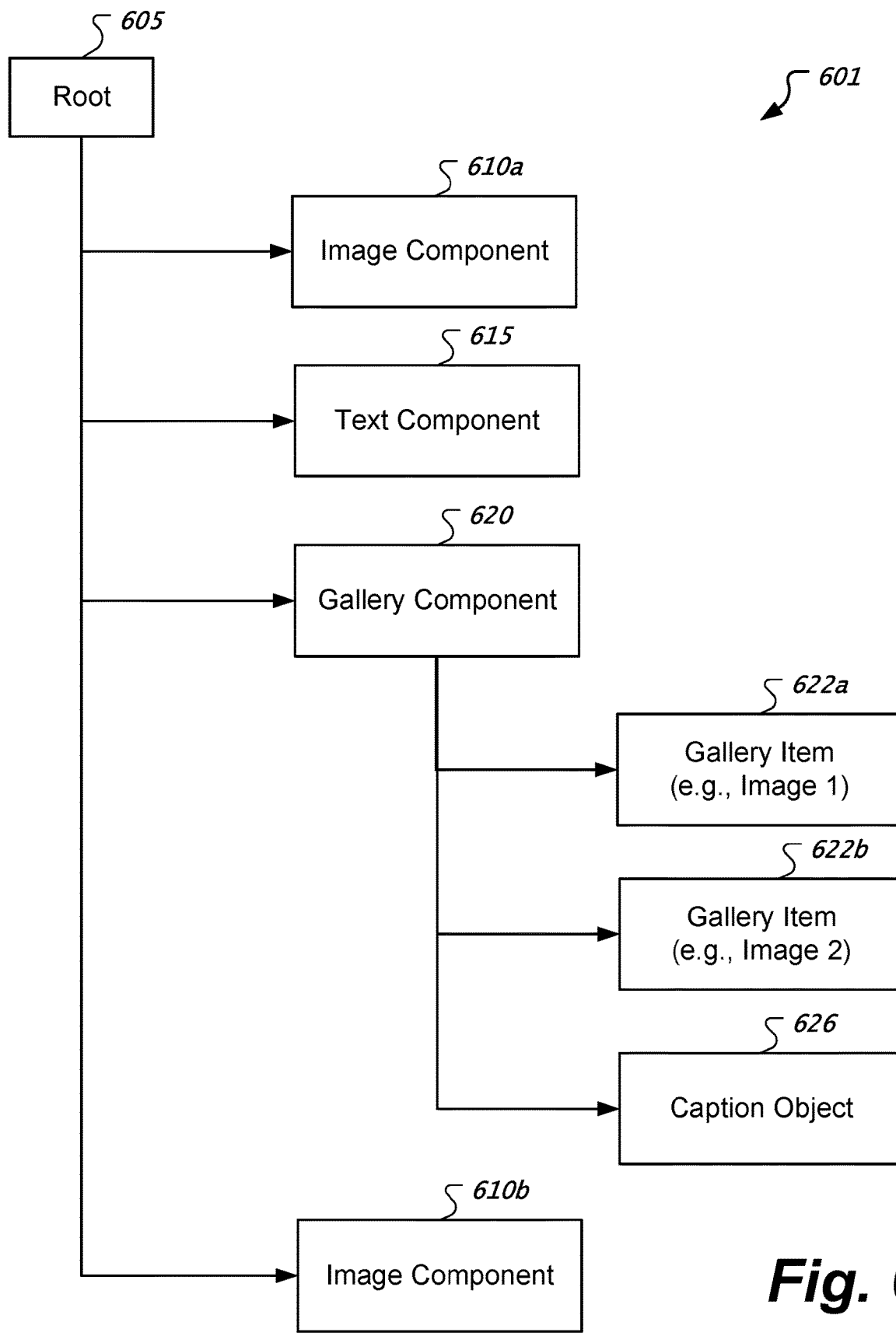
FIG. 6 illustrates a hierarchy of an example of a document that includes gallery, image, and text components.

FIG. 6 illustrates a hierarchy of an example of a document 601 that includes gallery, image, and text components. In some implementations, the document 601 is created in accordance with a file type format such as Extensible Markup Language (XML) or JavaScript Object Notation (JSON). Other file types are possible. The document 601 includes a high-level root 605. Under the high-level root 605, in this example, the document 601 includes image components 610a-b, text component 615, and a gallery component 620. The gallery component 620 includes gallery items 622a-b and a caption object 626. The gallery items 622a-b can be represented as objects within an array.

The gallery component 620 can be configured to cause a renderer to display a sequence of images in a gallery display area. In some implementations, the sequence of images is displayed as a horizontal strip. Other strip layouts are possible. The gallery component 620 can include a role element and an array of gallery items 622a-b. The role element can specify that a component is a gallery type. The array of gallery items 622a-b specifies the images that will appear when the authoring tool renders the gallery component 620. The order used in the array of gallery items 622a-b can affect layout and positioning in the displayed version of the gallery component.

Gallery items 622a-b can include images such as JPEG (with .jpg or .jpeg extension), PNG, or GIF images. Other types of image formats are possible. In some implementations, a gallery item 622a-b includes a link such as an URL of an image to display in the gallery component. In some implementations, image URLs can begin with http://, https://, or bundle://. If the image URL begins with bundle://, the referenced image file is stored in the same directory as the document. Each gallery item 622a-b can include a caption string. In some implementations, the authoring tool can selectively display a caption string of a gallery item 622a-b.

The gallery component 620 can include one or more objects such as a gallery caption string object 626, an anchor object that aligns the gallery component 620 with another component, a component animation object that applies an animation effect, such as a fade-in animation, to the gallery component 620, a behavior object that applies a motion effect or other physics effect, such as parallax or springy, a unique identifier for the gallery component, or a combination thereof. In some implementations, the component's unique identifier can be used to anchor the gallery component 620 with other components. The gallery component 620 can include a layout object such as an inline component layout object that contains layout information, or a string reference to a component layout that is defined at the top level of the document 601. In some implementations, if a layout object is not defined, size and position of the gallery component 620 can be based on various factors, such as the device type, the length of the content, and the role of the component. The gallery component 620 can include a style object such an inline component style object that defines the appearance of the gallery component, or a string reference to a component style that is defined at the top level of the document 601.

The image components 610a-b can be configured to cause a renderer to display respective images of the image components 610a-b in respective display areas. Each image component 610a-b can include an image such as a JPEG (with .jpg or .jpeg extension), PNG, or GIF image. Other types of image formats are possible. In some implementations, an image component 610a-b includes an image by including the image's URL rather than actual image data. In some implementations, an image URL can begin with http://, https://, or bundle://.

The following provides an example of a representation of the gallery component 620 in a JSON format:

```
{
  "role": "gallery",
  "caption": "Gallery caption",
  "items": [
    {
      "URL": "url://www.orange.org/image_lions.jpg",
      "caption": "Thanks to the record drought, mountain lions have begun to descend from the peaks, sometimes into urban settings."
    },
    {
      "URL": "bundle://image_coyotes.jpg",
      "caption": "Coyotes are also seen in cities more often."
    },
    {
      "URL": "bundle://image_city.jpg"
    }
  ]
}
```

Note that other representations of the gallery component 620 are possible such as in XML.

The authoring tool can be configured to render a gallery caption stored in a caption object 626 of the gallery component 620. If an image component 610a includes a caption and is moved into a gallery component 620, the tool can be configured to suppress the display of the image caption. The tool can be configured to save the image caption within the gallery component 620, so if the user decides to move the image from the gallery component 620 to another location within the document, the caption can be displayed again.

Figure 7:
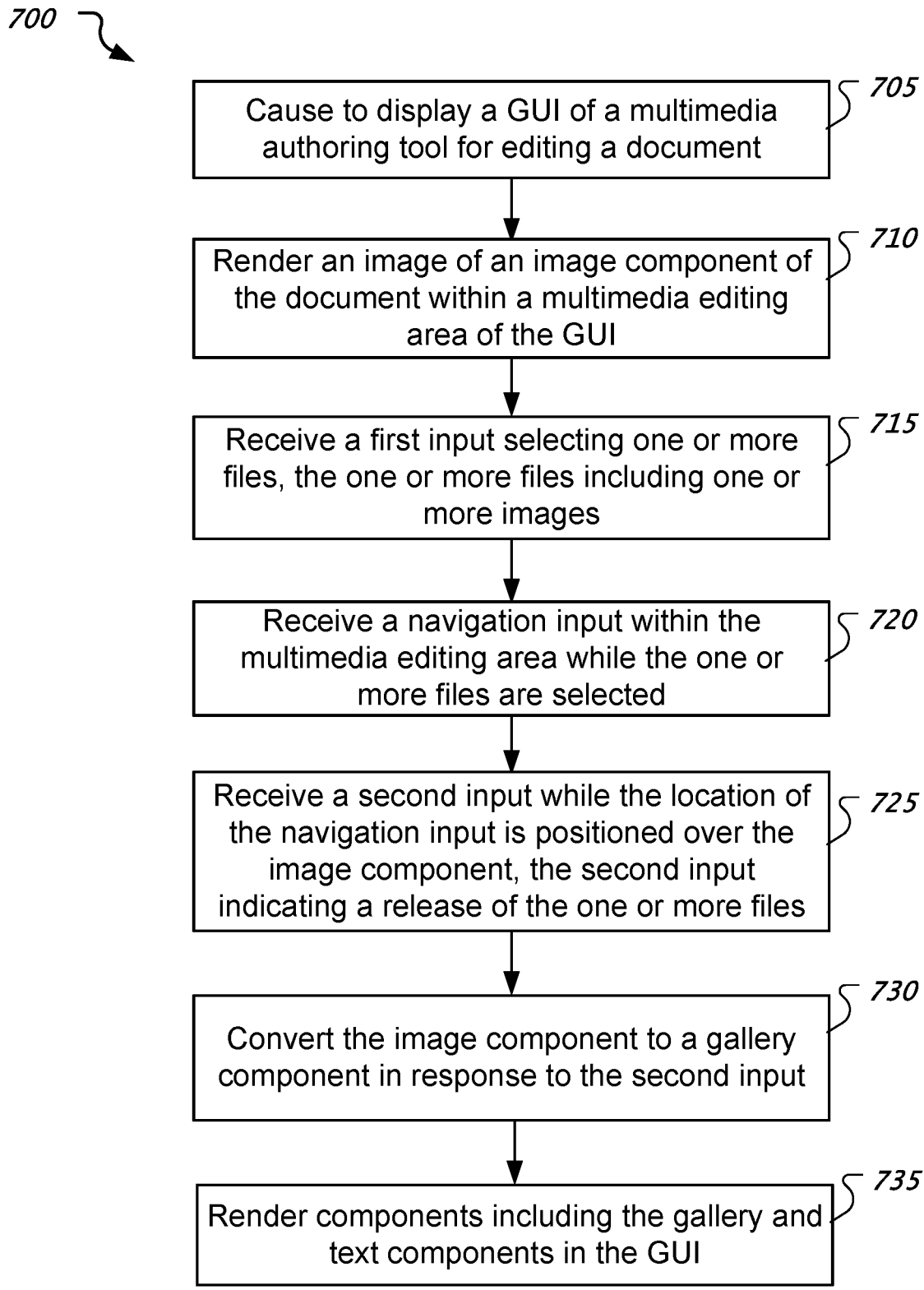
FIG. 7 illustrates an example of a process performed by a device to receive user inputs and to convert an image component into a gallery component based on the user inputs.

FIG. 7 illustrates an example of a process 700 performed by a device to receive user inputs and to convert an image component into a gallery component based on the user inputs. The process 700 can cause a device to display a GUI of a multimedia authoring tool for editing a document (705). The GUI of a multimedia authoring tool can include a multimedia editing area. The document can include, among other things, a first image component and a text component. In some implementations, the document includes XML or JSON expressions that describe components, and the authoring tool renders screen images based on those expressions. The process 700 can render an image of an image component of the document within a multimedia editing area of the GUI (710). Note that this image component includes a single image. In some implementations, the image component includes a single image by having a link to the single image such as a URL or a file path and filename. In some implementations, the image component includes a single image by having an image encoded therein.

The process 700 can receive a first input selecting one or more files, the one or more files including one or more second images (715). In some implementations, a file finder renders a list of files to a user. The user can perform actions such as a multi-file select via one or more user inputs such as gestures, mouse clicks and selecting, or keyboard inputs to select one or more files in the file finder. Moreover, the user can commence a drag and drop operation to import the one or more selected files into the document.

The process 700 can receive a navigation input within the multimedia editing area while the one or more files are selected (720). The navigation input can be associated with a location within the editing area. The navigation input can further be associated with the one or more files as selected via the first input. In some implementations, the navigation input is a stream of locations that represent coordinates of a cursor controlled by a pointing device. In some implementations, the process 700 can render an insertion indicator which moves around the editing area in accordance with the stream of locations. In some implementations, the process 700 can render a gallery creation indicator that includes an add icon, a number icon having a number that corresponds to a quantity of the one or more selected files, thumbnail images of the one or more selected files, or a combination thereof.

The process 700 can receive a second input while the location of the navigation input is positioned over the image component, the second input indicating a release of the one or more files (725). In some implementations, the second input is produced based on a release of a mouse button that was initially pressed to select the one or more files.

The process 700 can convert the image component to a first gallery component in response to the second input (730). In this example, the gallery component includes the image of the image component and the one or more images corresponding to the one or more selected files. The gallery component can be associated with a gallery display area and a control. The control can be operable for navigating the images of the gallery component in the gallery display area. In some implementations, converting the image component includes replacing the image component with a gallery component. In some implementations, converting the image component includes changing the image component's type from image to gallery and adding one or more additional images. The process 700 can render components including the gallery and text components in the GUI (735). Rendering the gallery component can include rendering at least a portion of the one or more images included in the gallery component.

Figure 8:
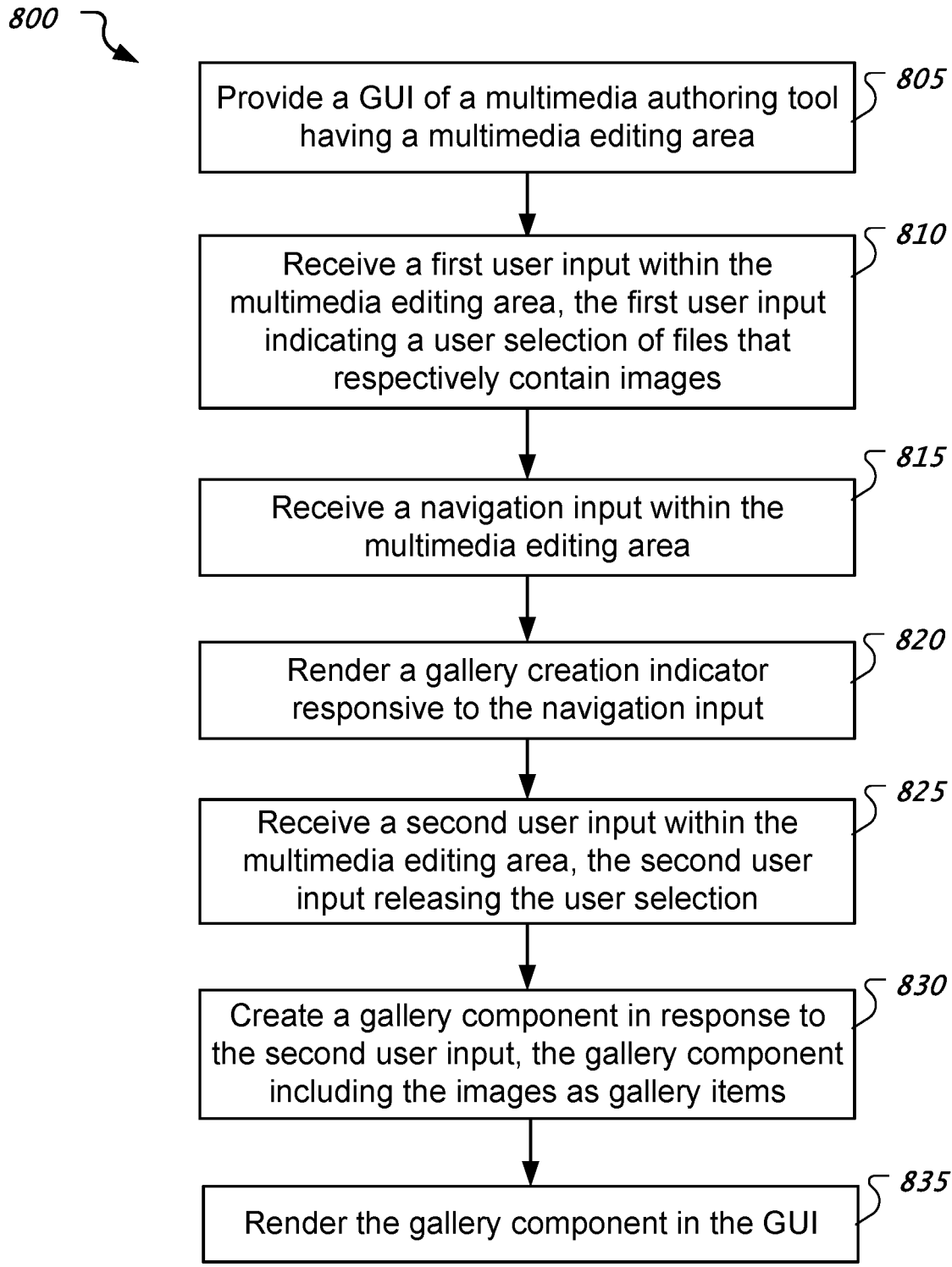
FIG. 8 illustrates an example of a process performed by a device to receive user inputs and to create a gallery component based on the user inputs.

FIG. 8 illustrates an example of a process 800 performed by a device to receive user inputs and to create a gallery component based on the user inputs. The process 800 can provide a GUI of a multimedia authoring tool having a multimedia editing area (805). The process 800 can receive a first user input within the multimedia editing area, the first user input indicating a user selection of files that respectively contain images (810). Various examples of user inputs include touch-based gestures, mouse movements, mouse clicks, and key presses. Other types of inputs are possible.

The process 800 can receive a navigation input within the multimedia editing area (815). The navigation input can be associated with a location within the editing area. The navigation input can be associated with the user selection. Various examples of navigation inputs include touch-based gestures, mouse movements, and key presses. The process 800 can render a gallery creation indicator responsive to the navigation input (820). In some implementations, the gallery creation indicator includes an add icon and a number, where the number corresponds to a quantity of the files associated with the user selection. The process 800 can receive a second user input within the multimedia editing area, the second user input releasing the user selection (825). Various examples of release user input include a release of a mouse button that was initially pressed to select the files or a gesture-based release such as a lift of a finger away from a touch screen.

The process 800 can create a gallery component in response to the second user input, the gallery component including the images as gallery items (830). In some implementations, the process 800 creates a component within a document, sets the component type to gallery, and includes gallery items corresponding to the files selected by the user. In some implementations, the process 800 includes in the gallery component an array of links to the files selected by the user. The process 800 can render, among other things, the gallery component in the GUI (835). Rendering the gallery component can include rendering at least a portion of one or more of the gallery items.

Figure 9:
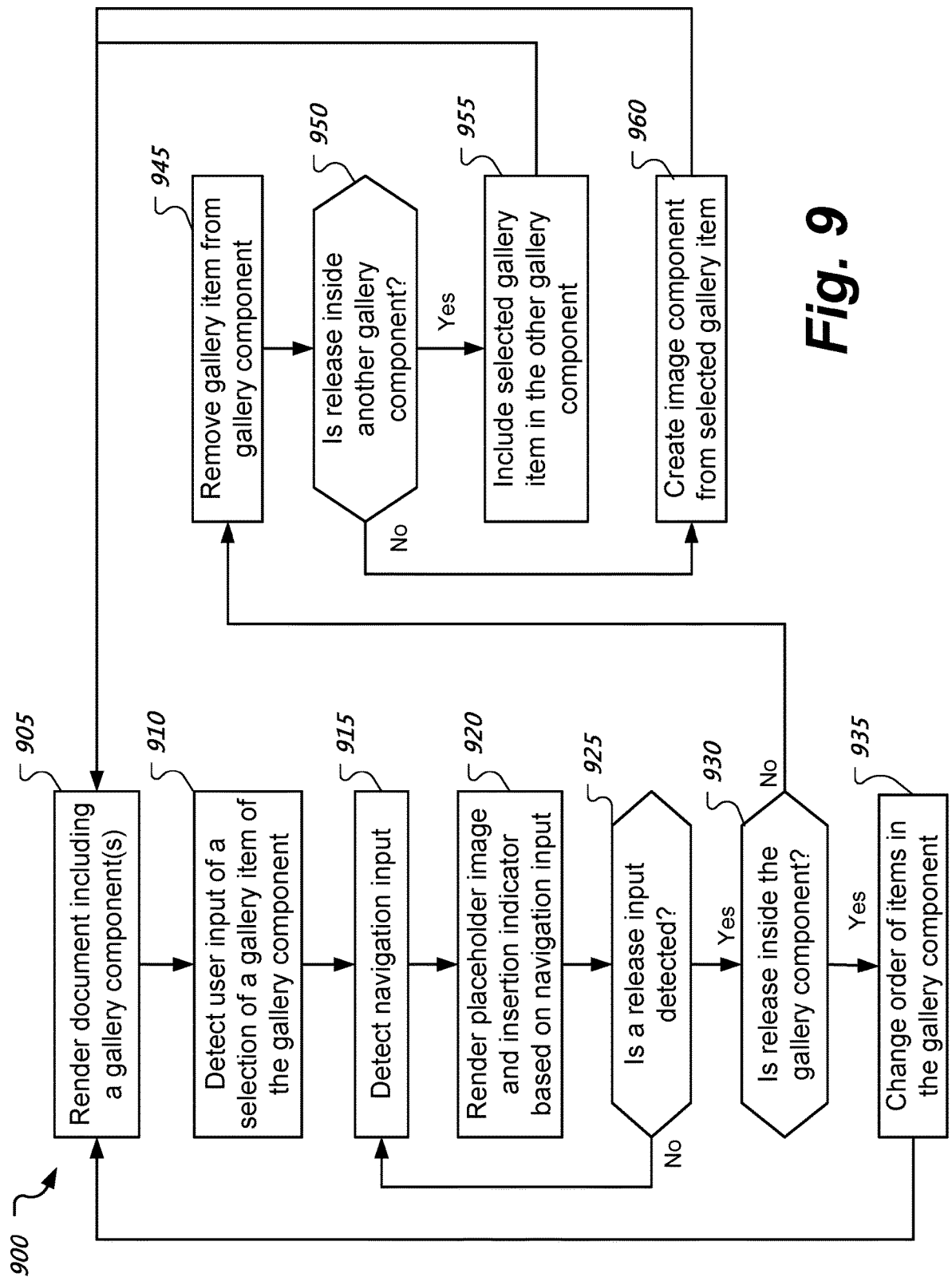
FIG. 9 illustrates an example of a process performed by a device to move a gallery item of a gallery component.

FIG. 9 illustrates an example of a process 900 performed by a device to move a gallery item of a gallery component. The process 900 can render a document including a gallery component (905). The process 900 can detect a user input of a selection of a gallery item of the gallery component (910). Various examples of user inputs include mouse movements, mouse clicks, touch-based gestures, and key presses. Other types of inputs are possible.

The process 900 can detect a navigation input (915). In some implementations, the navigation input is a stream of locations that represent coordinates of a cursor controlled by a pointing device such as a mouse of touch-based device. The process 900 can render a placeholder image and an insertion indicator based on navigation input (920). In some implementations, the process 900 creates a thumbnail version of the image of the gallery item as the placeholder image. The insertion indicator can be a horizontal insertion line indicator or a vertical insertion line indicator. The process 900 can determine whether a release input is detected (925). If a release input is not detected, the process continues to detect a navigation input at 915. Detecting an input can include receiving inputs from devices such as a mouse, keyboard, or a touch-sensitive pad or display.

If a release input is detected, the process 900 can determine whether the release is inside the gallery component (930). If inside, the process 900 can change the order of items in the gallery component (935). In some implementations, changing the order of items includes rearranging items in an array of gallery items. After the change, the process 900 can render the document (905) in response to order change within the gallery component.

If the release is outside of the gallery component, the process 900 can remove the selected gallery item from the gallery component (945). If there are no remaining gallery items in the gallery component, the process 900 can remove the gallery component from the document. If there is only one remaining image in the gallery component, the process 900 can convert the gallery component into an image component. The process 900 can determine whether the release is inside another gallery component (950). If inside another gallery component, the process 900 can include the selected gallery item in the other gallery component (955). If not inside another gallery component, the process 900 can create an image component from the selected gallery item (960). The process 900 can render the document (905) in response to the newly created image component or modified other gallery component.

Figure 10:
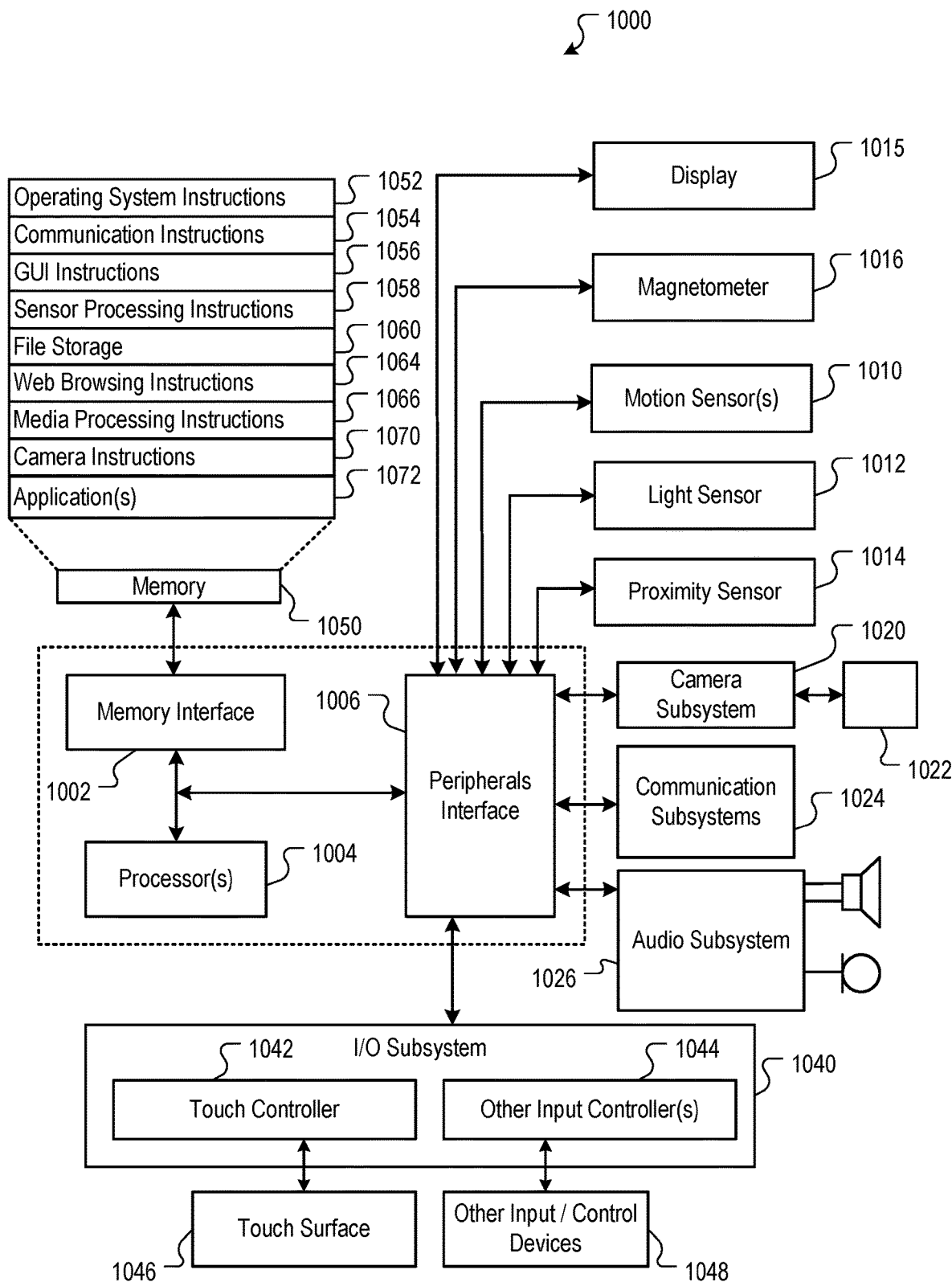
FIG. 10 illustrates a block diagram of an example of a device architecture.

FIG. 10 illustrates a block diagram of an example of a device architecture. The architecture may be implemented in any device 1000 for generating the features described in this specification, including but not limited to portable computers, smart phones and electronic tablets, game consoles, wearable devices and the like. Device 1000 can include memory interface 1002, data processor(s), image processor(s) or central processor(s) 1004, and peripherals interface 1006. Memory interface 1002, processor(s) 1004 or peripherals interface 1006 may be separate components or may be integrated in one or more integrated circuits. One or more communication buses or signal lines may couple the various components.

Sensors, devices, and subsystems may be coupled to peripherals interface 1006 to facilitate multiple functionalities. For example, motion sensor 1010, light sensor 1012, and proximity sensor 1014 may be coupled to peripherals interface 1006 to facilitate orientation, lighting, and proximity functions of the device. For example, in some implementations, light sensor 1012 may be utilized to facilitate adjusting the brightness of touch surface 1046. In some implementations, motion sensor 1010 (e.g., an accelerometer, gyros) may be utilized to detect movement and orientation of the device. Accordingly, display objects or media may be presented according to a detected orientation (e.g., portrait or landscape). Other sensors may also be connected to peripherals interface 1006, such as a temperature sensor, a biometric sensor, or other sensing device, to facilitate related functionalities. Electronic magnetometer 1016 (e.g., an integrated circuit chip) may also be connected to peripherals interface 1006 to provide data that may be used to determine the direction of magnetic North. Thus, electronic magnetometer 1016 may be used as an electronic compass. Camera subsystem 1020 and an optical sensor 1022, e.g., a charged coupled device (CCD) or a complementary metal-oxide semiconductor (CMOS) optical sensor, may be utilized to facilitate camera functions, such as recording photographs and video clips. Audio subsystem 1026 may be coupled to a speaker 1028 and one or more microphones 1030 to facilitate voice-enabled functions, such as voice recognition, voice replication, digital recording, and telephony functions.

Communication functions may be facilitated through one or more communication subsystems 1024. Communication subsystems 1024 can include one or more wireless communication subsystems such as radio frequency receivers and transmitters and/or optical (e.g., infrared) receivers and transmitters. Wired communication system can include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 1024 may depend on the communication network(s) or medium(s) over which the device 1000 is intended to operate. For example, a device can include wireless communication subsystems designed to operate over LTE, GSM, a GPRS network, an enhanced data GSM environment (EDGE) network, 802.x communication networks (e.g., Wi-Fi, Wi-Max), CDMA networks, NFC and a Bluetooth™ network. Communication subsystems 1024 can include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 1040 can include touch controller 1042 and/or other input controller(s) 1044. Touch controller 1042 may be coupled to a touch surface 1046. Touch surface 1046 and touch controller 1042 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1046. In one implementation, touch surface 1046 may display virtual or soft buttons and a virtual keyboard, which may be used as an input/output device by the user.

Other input controller(s) 1044 may be coupled to other input/control devices 1048, such as a mouse, keyboard, rocker switches, thumb-wheel, infrared port, USB port, and/or a pointer device such as a stylus. In some implementations, device 1000 may present recorded audio and/or video files, such as MP3, AAC, and MPEG video files. In some implementations, device 1000 can include the functionality of an MP3 player and can include a pin connector for tethering to other devices. Other input/output and control devices may be used.

Memory interface 1002 may be coupled to memory 1050. Memory 1050 can include high-speed random access memory or non-volatile memory, such as one or more magnetic disk storage devices, one or more optical storage devices, or flash memory (e.g., NAND, NOR). Memory 1050 may store operating system 1052, such as Darwin, RTXC, LINUX, UNIX, OS X, WINDOWS, or an embedded operating system such as VxWorks. Operating system 1052 can include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices. Memory 1050 can include graphical user interface instructions 1056 to facilitate graphic user interface processing, including a touch model for interpreting touch inputs and gestures; sensor processing instructions 1058 to facilitate sensor-related processing and functions; file storage 1060 for storing files such as documents; web browsing instructions 1064 to facilitate web browsing-related processes and functions; media processing instructions 1066 to facilitate media processing-related processes and functions; camera instructions 1070 to facilitate camera-related processes and functions; and application storage 1072 for storing applications, such as a multimedia authoring tool. In some implementations, such applications can be pre-installed on the device 1000, downloaded from an application store server, or a combination thereof. Images can be stored in the file storage 1060. The graphical user interface instructions 1056 can include instructions for rendering screen images to the display 1015 such as a LCD.

Each of the above identified instructions and applications may correspond to a set of instructions for performing one or more functions described above. These instructions need not be implemented as separate software programs, procedures, or modules. Memory 1050 can include additional instructions or fewer instructions. Furthermore, various functions of the device may be implemented in hardware and/or in software, including in one or more signal processing circuits, FPGA (field programmable gate array), or an ASIC (application-specific integrated circuit).

A technique performed by, a data processing apparatus, can include causing to display, by a graphical user interface of a multimedia authoring tool for editing a document, the graphical user interface including a multimedia editing area, the document including a first image component and a text component; rendering a first image component of the document within the multimedia editing area, the first image component including a first image; receiving a first input selecting one or more files, the one or more files including a second image; receiving a navigation input within the multimedia editing area while the one or more files are selected, the navigation input being associated with a location within the editing area, and the navigation input being associated with the one or more files; receiving a second input while the location of the navigation input is positioned over the first image component, the second input indicating a release of the one or more files; converting the first image component to a first gallery component in response to the second input, the first gallery component including the first image and the second image, the first gallery component being associated with a gallery display area and a control, the control operable for navigating the first and second images in the gallery display area; and rendering the first gallery component and the text component in the graphical user interface. Rendering the first gallery component can include rendering at least a portion of the first image, at least a portion of the second image, or both. In some implementations, a system includes a processor and a memory structure coupled with the processor, the memory structure being configured to store a document, the document including a first image component and a text component. The processor can be configured to perform operations associated with this technique.

In some implementations, the technique includes rendering a gallery creation indicator when the location is within a display area of the first image component. In some implementations, the gallery creation indicator includes an add icon and a number, the number corresponding to a quantity of the one or more files. In some implementations, the technique includes receiving a third input representing a location within a display area of the first gallery component, the third input selecting the first image; receiving a fourth input that indicates a move of the first image with respect to the second image in the first gallery component; and changing an order of the first and second images within the first gallery component based on the fourth input.

In some implementations, the technique includes receiving a third input representing a location within a display area of the first gallery component, the third input selecting the first image; detecting a fourth input moving the first image to an area outside of the first gallery component; removing the first image from the first gallery component; and creating a second image component based on the fourth input, the second image component including the first image. In some implementations, the technique includes detecting that the second image remains within the first gallery component; and converting the first gallery component to a third image component that includes the second image. In some implementations, the technique includes rendering a text box in the graphical user interface, the text box operable for adding a caption associated with the first gallery component.

In some implementations, the first and second images are arranged in the first gallery component in a horizontal strip, and the technique includes receiving a third input representing a hover over the gallery display area of the first gallery component, the third input comprising a swipe gesture; and causing to scroll the first and second images in the gallery display area in response to the third input. In some implementations, the technique includes detecting a third input, the third input including a drag operation and a drop operation directed to a second gallery component in the multimedia editing area; and adding the first and second images to the second gallery component in response to the drop operation. In some implementations, the technique includes rendering a contextual insertion indicator indicating an insertion point in the multimedia editing area for the first gallery component.

Another technique can include providing, by a data processing apparatus, a graphical user interface of a multimedia authoring tool, the graphical user interface including a multimedia editing area; receiving, by the data processing apparatus, a first user input within the multimedia editing area, the first user input indicating a user selection of a plurality of files, the plurality of files respectively including a plurality of images; receiving, by the data processing apparatus, a navigation input within the multimedia editing area, the navigation input being associated with a location within the editing area, and the navigation input being associated with the user selection; receiving, by the data processing apparatus, a second user input within the multimedia editing area, the second user input releasing the user selection; creating, by the data processing apparatus, a gallery component in response to the second user input, the gallery component including the images as gallery items; and rendering, by the data processing apparatus, the gallery component in the graphical user interface. Rendering the gallery component can include rendering at least a portion of one or more of the gallery items. The technique can include rendering, by the data processing apparatus, a gallery creation indicator that is responsive to the navigation input. The gallery creation indicator can include an add icon and a number, the number corresponding to a quantity of the plurality of files.

Another technique can include causing to display, by a data processing apparatus, a graphical user interface of a multimedia authoring tool, the graphical user interface including a multimedia editing area; rendering, by the data processing apparatus, a first displayed image component within the multimedia editing area, the first image component including a first image; receiving by the data processing apparatus a first input selecting one or more files, the one or more files including a second image; detecting, by the data processing apparatus, while the one or more files are selected, a navigation input within the multimedia editing area, the navigation input having an associated location positionable within the editing area and being associated with the selected one or more files; detecting, by the data processing apparatus, a second input while the positionable location of the navigation input is positioned over the first displayed image component; replacing, by the data processing apparatus, in response to the second input, the first image component with a first gallery component in response to the second selection input, wherein the first gallery component includes the first image and the second image, a gallery display area and a control, the control operable for scrolling the first and second images in the gallery display area; and rendering, by the data processing apparatus, the first gallery component in the graphical user interface. Rendering the first gallery component can include rendering at least a portion of the first image, at least a portion of the second image, or both.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, one or more ASICs or FPGAs.

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The apparatus can also include one or more memory structures such as nonvolatile memory, volatile memory, or both.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   causing to display, by a data processing apparatus, a graphical user interface of a multimedia authoring tool for editing a document, the graphical user interface including a multimedia editing area, the document comprising a first image component and a text component;

rendering, by the data processing apparatus, a first image component of the document within the multimedia editing area, the first image component including a first image;

receiving, by the data processing apparatus, a first input selecting one or more files, the one or more files including a second image;

receiving, by the data processing apparatus, a navigation input within the multimedia editing area while the one or more files are selected, the navigation input being associated with a location within the editing area, and the navigation input being associated with the one or more files;

receiving, by the data processing apparatus, a second input while the location of the navigation input is positioned over the first image component, the second input indicating a release of the one or more files;

converting, by the data processing apparatus, the first image component to a first gallery component in response to the second input, wherein the first gallery component comprises the first image and the second image, wherein the first gallery component is associated with a gallery display area and a control, the control operable for navigating the first and second images in the gallery display area; and rendering, by the data processing apparatus, the first gallery component and the text component in the graphical user interface, wherein rendering the first gallery component includes rendering at least a portion of the first image, at least a portion of the second image, or both.

2. The method of claim 1, wherein the first gallery component is created within the document, the method comprising:

rendering, by the data processing apparatus, a gallery creation indicator when the location of the navigation input is positioned within a display area of the first image component.

3. The method of claim 2, wherein the gallery creation indicator comprises an add icon and a number, the number corresponding to a quantity of the one or more files.

4. The method of claim 1, comprising:

receiving, by the data processing apparatus, a third input representing a location within a display area of the first gallery component, the third input selecting the first image;

receiving, by the data processing apparatus, a fourth input that indicates a move of the first image with respect to the second image in the first gallery component; and changing, by the data processing apparatus, an order of display for the first and second images within the first gallery component based on the fourth input.

5. The method of claim 1, comprising:

receiving, by the data processing apparatus, a third input representing a location within a display area of the first gallery component, the third input selecting the first image;

detecting, by the data processing apparatus, a fourth input moving the first image to an area outside of the first gallery component;

removing, by the data processing apparatus, the first image from the first gallery component; and creating, by the data processing apparatus, a second image component based on the fourth input, the second image component including the first image.

6. The method of claim 5, comprising:

detecting, by the data processing apparatus, that the second image remains within the first gallery component; and converting, by the data processing apparatus, the first gallery component to a third image component that includes the second image.

7. The method of claim 1, comprising:

rendering, by the data processing apparatus, a text box in the graphical user interface, the text box operable for adding a caption associated with the first gallery component.

8. The method of claim 1, wherein the first and second images are arranged in the first gallery component in a horizontal strip, the method comprising:

receiving, by the data processing apparatus, a third input representing a hover over the gallery display area of the first gallery component, the third input comprising a swipe gesture; and causing to scroll, by the data processing apparatus, the first and second images in the gallery display area in response to the third input.

9. The method of claim 1, comprising:

detecting, by the data processing apparatus, a third input, the third input comprising a drag operation and a drop operation directed to a second gallery component in the multimedia editing area; and adding, by the data processing apparatus, the first and second images to the second gallery component in response to the drop operation.

10. The method of claim 1, comprising:

rendering, by the data processing apparatus, a contextual insertion indicator indicating an insertion point in the multimedia editing area for the first gallery component.

11. A system comprising:

a processor; and a memory structure coupled with the processor, the memory structure being configured to store a document, the document comprising a first image component and a text component, wherein the processor is configured to perform operations comprising:

causing to display a graphical user interface of a multimedia authoring tool for editing the document, the graphical user interface including a multimedia editing area;

rendering a first image component of the document within the multimedia editing area, the first image component including a first image;

receiving a first input selecting one or more files, the one or more files including a second image;

receiving a navigation input within the multimedia editing area while the one or more files are selected, the navigation input being associated with a location within the editing area, and the navigation input being associated with the one or more files;

receiving a second input while the location of the navigation input is positioned over the first image component, the second input indicating a release of the one or more files;

converting the first image component to a first gallery component in response to the second input, wherein the first gallery component comprises the first image and the second image, wherein the first gallery component is associated with a gallery display area and a control, the control operable for navigating the first and second images in the gallery display area; and rendering the first gallery component and the text component in the graphical user interface, wherein rendering the first gallery component includes rendering at least a portion of the first image, at least a portion of the second image, or both.

12. The system of claim 11, wherein the first gallery component is created within the document, and wherein the operations comprise:
rendering a gallery creation indicator when the location of the navigation input is positioned within a display area of the first image component.

13. The system of claim 12, wherein the gallery creation indicator comprises an add icon and a number, the number corresponding to a quantity of the one or more files.

14. The system of claim 11, wherein the operations comprise:
receiving a third input representing a location within a display area of the first gallery component, the third input selecting the first image;
receiving a fourth input that indicates a move of the first image with respect to the second image in the first gallery component; and
changing an order of display for the first and second images within the first gallery component based on the fourth input.

15. The system of claim 11, wherein the operations comprise:
receiving a third input representing a location within a display area of the first gallery component, the third input selecting the first image;
detecting a fourth input moving the first image to an area outside of the first gallery component;
removing the first image from the first gallery component; and creating a second image component based on the fourth input, the second image component including the first image.

16. The system of claim 15, wherein the operations comprise:
detecting that the second image remains within the first gallery component; and converting the first gallery component to a third image component that includes the second image.

17. The system of claim 11, wherein the operations comprise:
rendering a text box in the graphical user interface, the text box operable for adding a caption associated with the first gallery component.

18. The system of claim 11, wherein the first and second images are arranged in the first gallery component in a horizontal strip, and wherein the operations comprise:
receiving a third input representing a hover over the gallery display area of the first gallery component, the third input comprising a swipe gesture; and
causing to scroll the first and second images in the gallery display area in response to the third input.

19. The system of claim 11, wherein the operations comprise:
detecting a third input, the third input comprising a drag operation and a drop operation directed to a second gallery component in the multimedia editing area; and
adding the first and second images to the second gallery component in response to the drop operation.

20. The system of claim 11, wherein the operations comprise:
rendering a contextual insertion indicator indicating an insertion point in the multimedia editing area for the first gallery component.

21. A method comprising:
providing, by a data processing apparatus, a graphical user interface of a multimedia authoring tool, the graphical user interface including a multimedia editing area;
receiving, by the data processing apparatus, a first user input within the multimedia editing area, the first user input indicating a user selection of a plurality of files, the plurality of files respectively including a plurality of images;
receiving, by the data processing apparatus, a navigation input within the multimedia editing area, the navigation input being associated with a location within the editing area, and the navigation input being associated with the user selection;
receiving, by the data processing apparatus, a second user input within the multimedia editing area, the second user input releasing the user selection;
creating, by the data processing apparatus, a gallery component in response to the second user input, the gallery component including the images as gallery items; and
rendering, by the data processing apparatus, the gallery component in the graphical user interface, wherein rendering the gallery component includes rendering at least a portion of one or more of the gallery items.

22. The method of claim 21, wherein the gallery component is created within the multimedia editing area, the method comprising:
rendering, by the data processing apparatus, a gallery creation indicator that is responsive to the navigation input.

23. The method of claim 22, wherein the gallery creation indicator comprises an add icon and a number, the number corresponding to a quantity of the plurality of files.

24. A method comprising:
causing to display, by a data processing apparatus, a graphical user interface of a multimedia authoring tool, the graphical user interface including a multimedia editing area;
rendering, by the data processing apparatus, a first displayed image component within the multimedia editing area, the first image component including a first image;
receiving by the data processing apparatus a first input selecting one or more files, the one or more files including a second image;
detecting, by the data processing apparatus, while the one or more files are selected, a navigation input within the multimedia editing area, the navigation input having an associated location positionable within the editing area and being associated with the selected one or more files;
detecting, by the data processing apparatus, a second input while the positionable location of the navigation input is positioned over the first displayed image component;
replacing, by the data processing apparatus, in response to the second input, the first image component with a first gallery component in response to the second input, wherein the first gallery component includes the first image and the second image, a gallery display area and a control, the control operable for selectively displaying the first and second images in the gallery display area; and
rendering, by the data processing apparatus, the first gallery component in the graphical user interface, wherein rendering the first gallery component includes rendering the control in conjunction with the gallery display area showing at least a portion of the first image, at least a portion of the second image, or both.

* * * * *